(No Model.)
S. C. MEDDICK.
FERTILIZER DISTRIBUTING ATTACHMENT FOR ROLLERS.
No. 284,461. Patented Sept. 4, 1883.
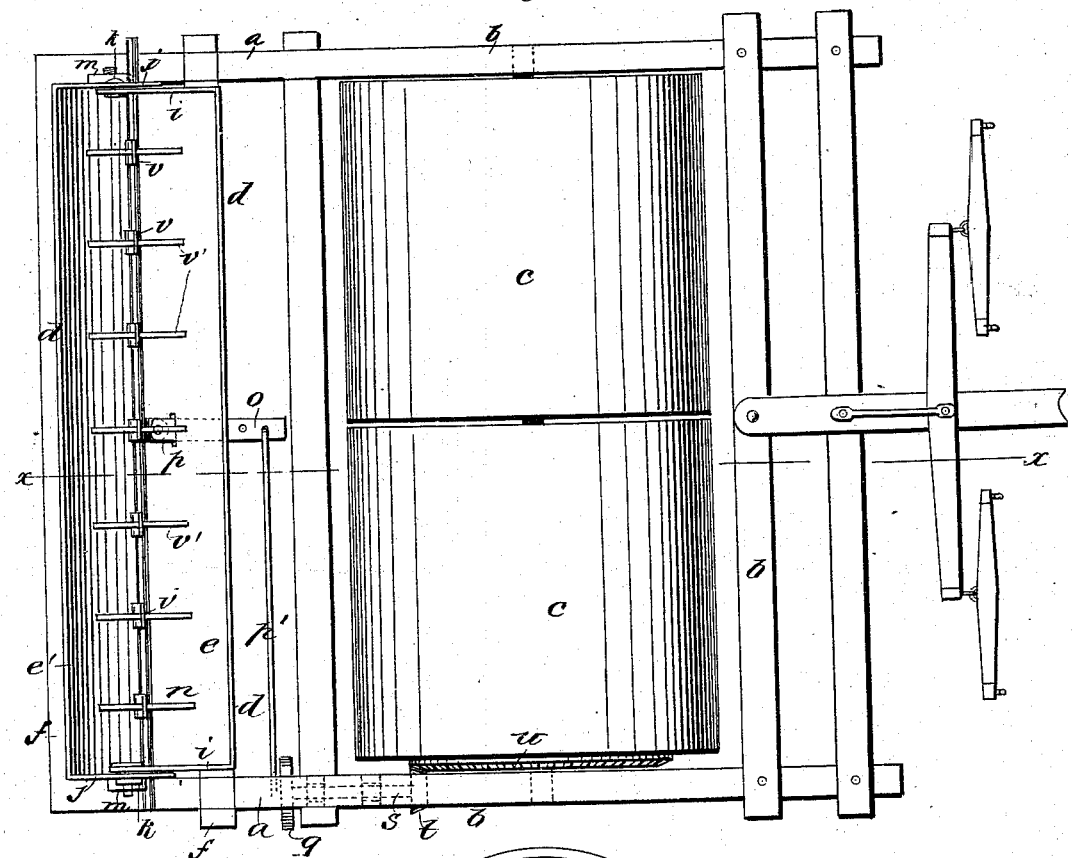
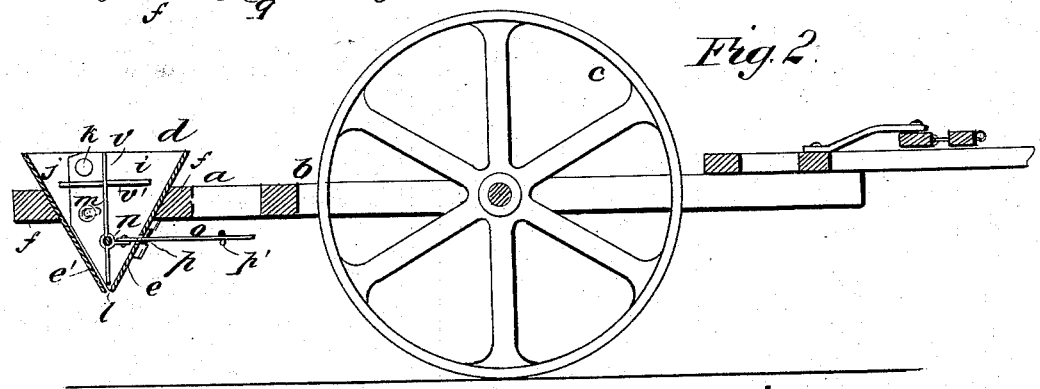
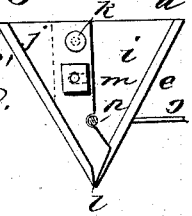
WITNESSES:
F. McArdle
C. Sedgwick
INVENTOR:
S. C. Meddick
BY Munn & Co
ATTORNEYS.

UNITED STATES PATENT OFFICE.

SANFORD C. MEDDICK, OF OVID, NEW YORK.

FERTILIZER-DISTRIBUTING ATTACHMENT FOR ROLLERS.

SPECIFICATION forming part of Letters Patent No. 284,461, dated September 4, 1883.

Application filed May 1, 1883. (No model.)

*To all whom it may concern:*

Be it known that I, SANFORD C. MEDDICK, of Ovid, in the county of Seneca and State of New York, have invented a new and Improved Fertilizer-Distributing Attachment for Rollers, of which the following is a full, clear, and exact description.

The object of the invention is to improve fertilizer-distributing attachments for rollers, as hereinafter described, and pointed out in the claim.

Reference is to be had to the accompanying drawings, forming part of this specification, in which similar letters of reference indicate corresponding parts in all the figures.

Figure 1 is a plan view of a land-roller with my improved fertilizer attachment appled to it. Fig. 2 is a transverse section of Fig. 1 on the line $x\ x$; and Figs. 3 and 4 are end elevations of the hopper, showing the contrivance for opening and closing the space through which the fertilizer is to be discharged.

I make a rear extension, $a$, of the frame $b$ of a land-roller of two drums or cylinders, $c$, on which extension I arrange a V-shaped fertilizer-hopper, $d$, the sides of which, $e\ e'$, drop between the parallel bars $f$ of the said extension-frame. The two sides have divided overlapping ends $i\ j$, which are pivoted together at $k$ near the top, for opening and closing the space at $l$, through which the pulverized material is to be discharged. The said ends $i\ j$ are also provided with a binding-screw and nut, $m$, to fasten them in any position to which the sides of the hopper may be set.

To allow the hopper to open at the bottom, it is required to be raised a little between the bars $f$, and when said hopper is closed it will settle down a little between said bars $f$. Thus the sides will at all times have support on the bars $f$. For stirring the fertilizer in the hopper to cause it to feed regularly, I have arranged a long rod, $n$, through it from end to end in bearings in the heads $i$ of part $e$, suitably for being reciprocated by a lever, $o$, fitted on a pivot, $p$, on the outside of part $e$ of the hopper, and connected inside of said hopper to the rod $n$ by its short arm, while the long arm of said lever is connected by rod $p'$ with a disk, $q$, on the end of a shaft, $s$, that gears by a pinion, $t$, with a bevel-wheel, $u$, on one of the roller-drums. The rod $n$ carries vertical arms $v$, which extend from bottom to top of the hopper, and near the upper ends have cross or horizontal arms $v'$, ranging transversely to the hopper, by which the contents of the hopper will be thoroughly stirred and effectually discharged from it.

Having thus described my invention, what I claim as new, and desire to secure by Letters Patent, is—

The combination, with parallel frame-bars $f\ f$ and a fastening device, $m$, of the two hopper-sections $e\ e'$, pivoted at $k$ and provided with overlapping ends $i\ j$, whereby the feed may be adjusted by letting down the sections more or less between said bars, as described.

SANFORD C. MEDDICK.

Witnesses:
ALFRED B. HAUSE,
JONATHAN D. THOMAS.